(12) United States Patent
Ribbers

(10) Patent No.: US 10,794,471 B2
(45) Date of Patent: Oct. 6, 2020

(54) METHOD FOR OPERATING A CONTINUOUSLY VARIABLE TRANSMISSION INCORPORATING A DRIVE BELT IN A MOTOR VEHICLE

(71) Applicant: Robert Bosch G.m.b.H., Stuttgart (DE)

(72) Inventor: Peter Ribbers, Tilburg (NL)

(73) Assignee: ROBERT BOSCH GMBH, Stuttgart (DE)

(*) Notice: Subject to any disclaimer, the term of this patent is extended or adjusted under 35 U.S.C. 154(b) by 357 days.

(21) Appl. No.: 15/857,394

(22) Filed: Dec. 28, 2017

(65) Prior Publication Data

US 2018/0187772 A1    Jul. 5, 2018

(30) Foreign Application Priority Data

Dec. 30, 2016    (NL) ..................... 1042205

(51) Int. Cl.
| F16H 57/04 | (2010.01) |
| F16H 59/72 | (2006.01) |
| F16G 5/16  | (2006.01) |
| F02D 41/02 | (2006.01) |

(52) U.S. Cl.
CPC ........... *F16H 57/0489* (2013.01); *F16G 5/16* (2013.01); *F16H 57/0413* (2013.01); *F16H 59/72* (2013.01); *F02D 41/0215* (2013.01)

(58) Field of Classification Search
CPC ............ F16H 57/0489; F16H 57/0456; F16H 61/662; F16H 57/0434; F16H 57/05
USPC ........................................................ 474/43
See application file for complete search history.

(56) References Cited

U.S. PATENT DOCUMENTS

| 4,297,119 | A | * | 10/1981 | Ando ..................... C03B 19/101 65/141 |
| 5,033,989 | A | * | 7/1991 | Shimaguchi ........ F16H 57/0421 184/11.5 |
| 5,273,492 | A | * | 12/1993 | Kashiwase .......... F16H 57/0434 474/28 |
| 5,605,513 | A | * | 2/1997 | Van Der Hardt Aberson ............ F16H 57/0421 474/43 |
| 5,649,876 | A | * | 7/1997 | Morishita ......... F16H 61/66259 474/18 |
| 5,951,421 | A | * | 9/1999 | D'Herripon ........ F16H 57/0434 192/224 |
| 6,068,565 | A | * | 5/2000 | Riemer ............... F16H 57/0456 474/18 |
| 6,435,994 | B1 | * | 8/2002 | Friedmann ................ F16H 7/18 474/111 |

(Continued)

FOREIGN PATENT DOCUMENTS

| DE | 10 2004 029 680 A1 | 12/2005 |
| EP | 0 626 526 A1 | 11/1994 |
| EP | 1 167 829 A1 | 1/2002 |

*Primary Examiner* — Henry Y Liu

(74) *Attorney, Agent, or Firm* — Nixon & Vanderhye

(57) ABSTRACT

Disclosed is a method for operating a continuously variable transmission including two pulleys, each defining an effectively V-shaped circumference groove of variable width, a drive belt, wrapped around the pulleys, and a cooling system, which cooling system is provided with a controller for supplying a controlled amount of a cooling agent to the drive belt. The controller is arranged to supply at least a minimum amount of the cooling agent to the drive belt during operation of the transmission.

19 Claims, 2 Drawing Sheets

(56) References Cited

U.S. PATENT DOCUMENTS

| | | | |
|---|---|---|---|
| 6,494,797 B1* | 12/2002 | Homm | F16H 57/0434 474/18 |
| 6,537,166 B1* | 3/2003 | Adriaenssens | B24B 29/04 451/11 |
| 6,626,781 B2* | 9/2003 | Van Der Kamp | F16H 57/0456 474/91 |
| 6,881,165 B2* | 4/2005 | Endo | B60K 6/48 417/350 |
| 7,125,355 B2* | 10/2006 | Schmidt | F16H 57/0456 474/91 |
| 7,438,659 B2* | 10/2008 | Kim | F16H 57/0489 184/15.2 |
| 8,672,097 B2* | 3/2014 | Yagasaki | F16H 57/0489 184/15.1 |
| 8,918,199 B2* | 12/2014 | Claveroulas | C21D 1/667 700/147 |
| 9,464,687 B2* | 10/2016 | Baba | F16G 5/16 |
| 2002/0007982 A1* | 1/2002 | Howard | F16N 17/00 184/6.2 |
| 2002/0013189 A1* | 1/2002 | Van Der Kamp | F16H 57/0456 474/91 |
| 2002/0036120 A1* | 3/2002 | Omote | F16H 57/0489 184/6.12 |
| 2004/0082416 A1* | 4/2004 | Schmidt | F16H 57/0456 474/91 |
| 2005/0096164 A1* | 5/2005 | Kim | F16H 57/0489 474/91 |
| 2005/0231047 A1* | 10/2005 | Yamane | F16H 57/0463 310/52 |
| 2007/0199524 A1* | 8/2007 | Nagahashi | F01M 1/08 123/41.35 |
| 2007/0277762 A1* | 12/2007 | Takada | F01L 1/024 123/90.31 |
| 2009/0082172 A1* | 3/2009 | Mori | F16H 61/66272 477/46 |
| 2010/0069184 A1* | 3/2010 | Baba | F16G 5/16 474/91 |
| 2010/0145591 A1* | 6/2010 | Rolando | F16H 7/18 701/102 |
| 2010/0292900 A1* | 11/2010 | Shimozato | F16D 48/02 701/53 |
| 2011/0183792 A1* | 7/2011 | Yagasaki | F16H 57/0456 474/43 |
| 2011/0266725 A1* | 11/2011 | Mehrain | C21D 9/46 266/44 |
| 2011/0270433 A1* | 11/2011 | Claveroulas | C21D 1/667 700/110 |
| 2012/0132172 A1* | 5/2012 | Kobayashi | F01M 1/08 123/196 R |
| 2013/0139768 A1* | 6/2013 | Takemoto | F01M 1/08 123/41.02 |
| 2016/0131245 A1* | 5/2016 | Imai | F16H 57/0446 476/8 |

\* cited by examiner

METHOD FOR OPERATING A CONTINUOUSLY VARIABLE TRANSMISSION INCORPORATING A DRIVE BELT IN A MOTOR VEHICLE

BACKGROUND OF THE INVENTION

Field of the Invention

The present invention relates to the continuously variable transmission according to the preamble of the following claim 1, which transmission is well known in the art, for example from the European patent EP-A-1 167 829, and is widely applied in, in particular, passenger motor vehicles.

Description of the Related Art

Such a transmission typically comprises a drive belt in the form of a so-called pushbelt that is known per se, for example from the European patent EP-A-0 626 526. The known pushbelt comprises metal, in particular steel transverse elements that are slidingly incorporated in such belt in a virtually continuous row along the circumference of an endless tensile means thereof, which tensile means primarily has the function of confining and guiding the transverse elements. Typically, the endless tensile means is composed of two sets of a number a mutually nested, i.e. radially stacked flat and thin steel rings. The transverse elements are each provided with a convexly curved surface section, denoted rocking edge, allowing adjacent element to mutually rotate about the axial direction and follow a curved trajectory, while remaining in pushing contact with each other.

In such transmission, a torque is transferred from one pulley to the other by clamping the drive belt between conical steel discs of the respective pulley under the influence of a clamping force, for which purpose at least one disc of the pulley is included axially moveable by means of an actuator. The clamping force is born by the individual transverse elements of the belt via predominantly axially oriented contact faces thereof. The clamping force allows a rotational movement of a driving pulley to be transferred to the drive belt by friction. At the other, i.e. driven pulley the force underlying said rotational movement of the driving pulley is conversely and also frictionally transferred from drive belt to the discs of the driven pulley. Hereto, the transverse elements of the belt are on both axial sides thereof provided with predominantly axially oriented contact faces that arrive in friction contact with the pulley discs of a respective the pulley.

The radius at which the drive belt runs in each pulley can be changed by changing the clamping force at each pulley in relation to one another, hereby a mathematical quotient between such radii represents a so-called geometric ratio of the transmission, whereas a ratio between the rotational speeds of the pulleys represents the actual speed ratio of the transmission.

During operation of the transmission it is imperative to lubricate and cool the moving parts thereof, such as the drive belt and the pulleys, to both minimize friction heat losses and to prevent overheating of those transmission parts. Therefore, the known transmission further includes a cooling system, which system is arranged to supply a cooling agent, such as a synthetic oil, to at least the drive belt and to re-circulate the cooling agent via a heat exchange device, such as an oil cooler, by means of a pump. Obviously, by such cooling requirement energy is consumed, to the detriment of the overall operating efficiency of the transmission. Therefore, i.e. to improve transmission efficiency, it is known in the art to control such cooling agent supply flow, i.e. belt cooling flow for short, in relation to an amount of friction heat that is being generated between the drive belt and the pulleys and between the constituent parts of the drive belt. An example of such known art is provided by the German patent application No. DE 10 2004 029 680 A1 that proposes to regulate the belt cooling flow in relation to a measured temperature of the transmission, in particular of a part of the cooling system thereof.

BRIEF SUMMARY OF THE INVENTION

It is an object of the present disclosure to improve the known transmission and its method of operation. The present disclosure departs from the observation that, if the belt cooling flow is regulated in relation to transmission temperature, such flow can become very low during transmission operation when a relatively low amount of torque is being transmitted by the transmission at a relatively high speed of the motor vehicle and/or at a relatively low ambient temperature. In these operating conditions the temperature of the cooling agent exiting the heat exchange device is relatively low and the friction heat being generated is relatively low as well.

According to the known art, such a low belt cooling flow is preferable from the perspective of the operating efficiency of the transmission. However, according to the present disclosure, a secondary, previously unnoticed effect can occur as well at a low flow rate of the cooling agent, namely an increased rate of wear of the rocking edges of the transverse elements was observed in certain operating conditions. Although such increased wear is in fact limited and, in particular, is not problematic from a functional point of view such that it will normally go unnoticed, it can be related to small but not-negligible reduction of the transmission efficiency. By the wear of the rocking edges a clearance within the row of transverse elements relative to the circumference length of the endless tensile means increases, whereby a slipping of the transverse elements relative to pulley discs increases as a consequence.

According to the present disclosure, the known method for operating the transmission of regulating of the belt cooling flow in dependence on the transmission temperature is optimized by applying a lower limit for the belt cooling flow, i.e. by applying a minimum belt cooling flow under all circumstances, i.e. operating conditions during transmission operation. Values of 1 to 1.5 liter per minute have been determined to be practical, broadly applicable values for such minimum belt cooling flow with the value of 1.5 liter per minute being on the safe side in terms of securely avoiding any excessive wear of the drive belt.

In an embodiment of the method for operating the transmission according to the present disclosure a target minimum temperature of the transmission is set. Below such target minimum temperature the said minimum belt cooling flow is applied, whereas above such target minimum temperature the belt cooling flow is increased above the minimum belt cooling flow. This particular embodiment departs from the observation that the friction between the drive belt and the pulleys increases as the temperature of the cooling agent increases. According to the present disclosure, this observed phenomenon can be related to the viscosity of the cooling agent that decreases as the temperature increases. A lower viscosity helps to favorably minimize the amount of cooling agent that is present in the friction contact between the contact faces of the transverse elements and the pulley discs, i.e. in the so-called boundary lubrication layer between such components. Thus, a higher transmission temperature improves the operating efficiency of the transmission. Values of 120 to 140 degrees Centigrade have been determined to be practical, broadly applicable values for such target minimum temperature of the transmission, as defined by the temperature of the cooling agent recirculated away from the said friction contact between the transverse elements and the pulley discs.

Several options are available the control of the belt cooling flow in relation to the target minimum temperature. In a first example hereof, it is simply switched from the said minimum belt cooling flow directly to a maximum belt cooling flow and vice versa when the transmission temperature exceeds, respectively falls below the target minimum temperature. A hysteresis may be applied in relation to such cooling flow control, by defining a first target minimum temperature for switching from the minimum to the maximum belt cooling flow, which first target minimum temperature is some degrees Centigrade higher than a second target minimum temperature for switching from the maximum to the minimum cool flow.

Alternatively, the belt cooling flow can be gradually increased from the minimum belt cooling flow to the maximum belt cooling flow in proportion with the transmission temperature. Preferably in this case, the maximum belt cooling flow is reached at 160 degrees Centigrade or less, as defined by the temperature of the cooling agent recirculated away from the said friction contact between the transverse elements and the pulley discs, in order to prevent chemical degradation of the cooling agent and/or a tempering of the quench hardened transverse elements. More in particular, the temperature of the cooling agent is hereto measured at or shortly following its discharge point from a transmission chamber containing the drive belt and the pulleys.

Furthermore according to the present disclosure, the belt cooling flow can be advantageously directed to bypass the oil cooler, at least in part, when the said target minimum temperature of the transmission is not yet reached. In this way, i.e. by not, or at least less effectively cooling the cooling agent itself, the said target minimum temperature will be reached more quickly and/or will be reached also the said operating conditions of a low torque being transmitted, a high vehicle speed and/or a low ambient temperature.

BRIEF DESCRIPTION OF THE DRAWINGS

The method for operating a continuously variable transmission according to the present disclosure will now be elucidated further by way of an embodiment example with reference to the following figures, whereof.

DETAILED DESCRIPTION OF THE PREFERRED EMBODIMENTS

Figure 1:
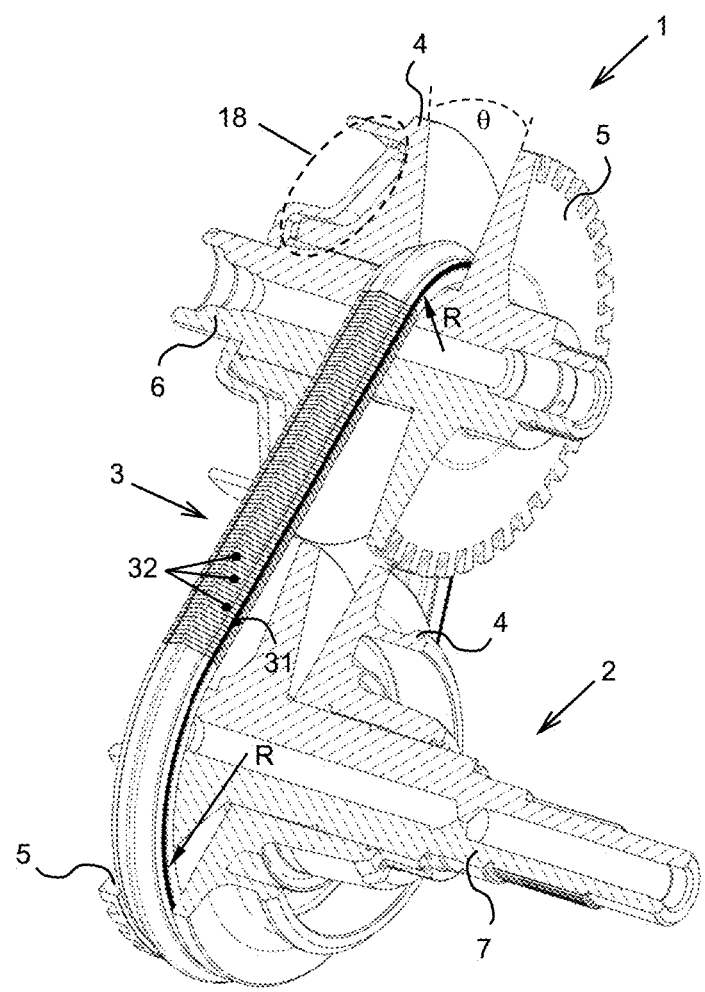
FIG. 1 provides a schematic perspective view of a known continuously variable transmission with a drive belt running over two pulleys.

FIG. 1 shows the central parts of a known continuously variable transmission or CVT that is commonly applied in the drive-line of motor vehicles between an engine and a driven wheel thereof. The transmission comprises two pulleys 1, 2 that are each provided with a pair of conical pulley discs 4, 5 mounted on a pulley shaft 6 or 7, between which pulley discs 4, 5 a predominantly V-shaped circumferential pulley groove is defined. At least one pulley disc 4 of each pair of pulley discs 4, 5, i.e. of each pulley 1, 2, is axially moveable along the pulley shaft 6, 7 of the respective pulley 1, 2. A drive belt 3 is wrapped around the pulleys 1, 2, located in the pulley grooves thereof.

During operation of the transmission of FIG. 1, the drive belt 3 is clamped between the pulley discs 4, 5 of each pulley 1, 2 by means of hydraulic piston-and-cylinder assembly 17 that is associated with the moveable disc 4. By exerting a hydraulic pressure in the cylinder of the piston-and-cylinder assembly 8, the said axially moveable pulley disc 4 is urged towards the other disc 5 of the respective pulley 1, 2, such that the drive belt 3 is clamped between the pulley discs 4, 5 of the respective pulley 1, 2 with a certain force. The clamping forces at both pulleys 1, 2 together determine, not only a friction force between the drive belt 3 and the respective pulleys 1, 2, which friction force determines the torque that can be transferred by the transmission, but also determine a radial position R of the drive belt 3 at each pulley 1, 2 between the pulley discs 4, 5 thereof. The quotient or ratio between which radial position(s) R determines a speed ratio of the transmission.

Figure 2:
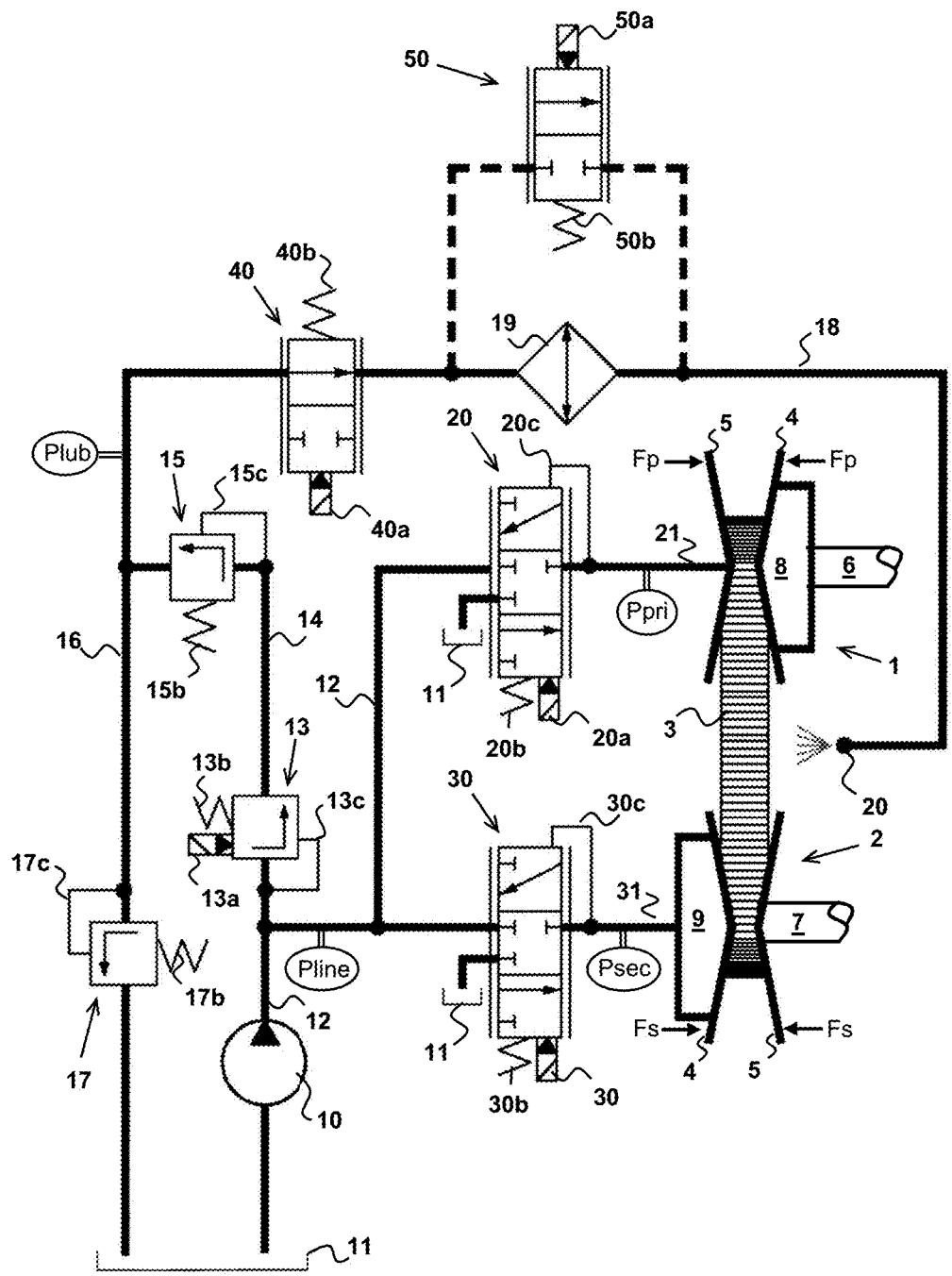
FIG. 2 provides a schematic illustration of a hydraulic control system for the known transmission in accordance with the present disclosure.

A hydraulic control system is provided to operate the hydraulic piston-and-cylinder assembly 17 of each pulley 1, 2. In FIG. 2 an embodiment of the basic hydraulic layout of such control system is illustrated. The control system comprises an oil pump 10 for generating a pump oil flow from an oil reservoir 11 at low, usually ambient pressure to a main line 12 of the control system at high(-er) pressure. The oil pressure in this main line 12, i.e. the line pressure Pline, is controlled by means of a line pressure valve 13. This line pressure valve 13 is provided with valve biasing means including a spring 13b, a valve actuator 13a and a pressure-feedback line 13c that together determine the line pressure Pline in a well-known manner. Typically, the valve actuator 13a is incorporated in the control system in the form of a controllable pilot pressure, which pilot pressure is, in turn, controlled by a solenoid valve (not shown) in response to an electric signal supplied to it by a transmission control unit (not shown).

From the main line 12, the pressure chambers 8, 9 of the piston-and-cylinder assemblies of the pulleys 1, 2 are supplied with pressurized oil. In particular, a primary clamping force Fp on the drive belt 3 results from a primary oil pressure Ppri generated in a pressure chamber 8 of the piston-and-cylinder assembly 17 that is associated with the primary pulley 1 and a secondary clamping force Fs on the drive belt 3 results from a secondary oil pressure Psec generated in a pressure chamber 9 of the piston-and-cylinder assembly 17 that is associated with the secondary pulley 2. For the control of the primary pressure Ppri and the secondary pressure Psec, two further valves 20, 30 are incorporated in the control system. A primary pressure valve is interposed between the main line 12 and a primary hydraulic branch 21 that hydraulically connects to the primary cylinder 8 and a secondary pressure valve 30 is interposed between the main line 12 and a secondary hydraulic branch 31 that hydraulically connects to the secondary cylinder 8. Both the primary pressure valve 20 and the secondary pressure valve 30 are provided with valve biasing means of their own, respectively including a spring 20b; 30b, a valve actuator 20a; 30a and a pressure-feedback line 20c; 30c.

For supplying oil to a respective pressure chamber 8, 9, to raise the respective cylinder pressure Ppri, Psec and thus increase the belt clamping force and/or to increase the volume of a respective pressure chamber 8, 9 and thus move the moveable disc 4 towards the fixed disc 5 and increase the radial position R of the belt 3, the respective pressure chamber 8, 9 is connected to the main line 12 by the primary valve 20 or the secondary valve 30 respectively. For discharging oil from a respective pressure chamber 8, 9, to relieve the respective cylinder pressure Ppri, Psec and/or decrease its respective volume, the respective pressure chamber 8, 9 to the reservoir 11 by the primary valve 20 or the secondary valve 30 respectively.

The part of the pump oil flow that is not supplied to the pressure chambers 8, 9, is allowed to pass by the line pressure valve 13 from the main line 12 into an auxiliary line 14 of the control system. The pressure of the oil hydraulic fluid in the auxiliary line 14, i.e. the auxiliary pressure Paux, is controlled by means of a further pressure control valve, i.e. an auxiliary pressure valve 15. In FIG. 2, the auxiliary pressure valve 15 is provided with valve biasing means that consist (only) of a spring 15b and a pressure-feedback line 15c, which means that—in this example—the auxiliary pressure Paux is controlled to a predetermined, fixed pressure level. The pressurized hydraulic fluid in the auxiliary line 14 is typically applied to operate one or more auxiliary hydraulic functions of the transmission such as the opening or closing of a clutch that may be provided in the drive line to (dis-)connect the load L from the engine E.

The part of the pump oil flow that is neither used to supply the pressure chambers 8, 9 nor to supply the auxiliary hydraulic functions, is allowed to pass by the auxiliary pressure valve 15 from the auxiliary line 14 into a lubrication line 16 of the control system. In the presently illustrated embodiment thereof, the control system is provided with a lubrication pressure valve 17 to set a lubrication pressure Plub. However, often hydraulic restrictions are used to distribute the available oil flow between the various transmission components to be lubricated. In FIG. 2, the lubrication pressure valve 17 is provided with valve biasing means that consist of a spring 17b and a pressure-feedback line 17c, which means that—in this example—the lubrication pressure Plub is controlled to a predetermined, fixed pressure level.

From the lubrication line 16 a/o the drive belt 3 is supplied with oil via a supply line 18 for the lubrication and cooling of the various friction contacts between its internal components and with the pulleys 1, 2. A hydraulic valve 40, in particular a flow valve 40, is interposed between the lubrication line 16 and the supply line 18 to control the amount of oil supplied to the belt 3, i.e. to control the belt cooling flow. Hereto, the flow valve 40 is provided with valve biasing means that consist of a valve actuator 40a and a spring 40b. An actuation force exerted by the valve actuator 40a determines the flow of oil that is allowed to pass from the lubrication line 16 into the supply line 18. Furthermore, a heat exchange device or oil cooler 19 is included in the supply line 18 to bring the temperature of the oil of the belt cooling flow down just before it is applied to, in particular sprayed on the drive belt 3 through one or more nozzles 20.

In the known transmission, the belt cooling flow is set in relation to the temperature of the oil by the controlled actuation of the flow valve 40 via the valve actuator 40a. Hereby the belt cooling flow is increased as the oil temperature increases, e.g. due to an increased friction between the drive belt 3 and the pulleys 1, 2, and vice versa. As such friction heat becomes low, the belt cooling flow will thus be reduced by the flow valve 40, whereby the transmission efficiency improves. However, according to the present disclosure, a minimum belt cooling flow is set irrespective of the oil temperature. Hereby, an increased wear rate of the drive belt 3 can be securely and favorably avoided. A minimum belt cooling flow value of 1.5 liter per minute was determined to be practical, broadly applicable value in this respect. This minimum belt cooling flow can be ensured by including a second supply line from the lubrication line 16 to the drive belt 3 in the known control system (not shown), but also by the design and/or corresponding actuation of the flow valve 40.

When applying such minimum belt cooling flow in accordance with the present disclosure, it results that the oil temperature can become low in certain operation conditions of the transmission, such as a low torque being transmitted, a high vehicle speed and/or a low ambient temperature. A (too) low oil temperature is, however, undesirable, since the viscosity of the oil will then be high relatively such that the friction between the drive belt 3 and the pulleys 1, 2 will not be optimal. Therefore, according to the present disclosure and as illustrated in FIG. 3 a bypass valve 50 is included in the control system that allows the belt cooling flow to wholly or partly bypass the oil cooler 19, at least when said minimum belt cooling flow is controlled and the oil temperature is below a defined minimum target temperature of the transmission. In the embodiment thereof of FIG. 2, the bypass valve 50 is provided with valve biasing means that consist of a valve actuator 50a and a spring 50b to control the flow of oil bypassing the oil cooler 19.

The present disclosure, in addition to the entirety of the preceding description and all details of the accompanying figures, also concerns and includes all of the features in the appended set of claims. Bracketed references in the claims do not limit the scope thereof, but are merely provided as non-limiting example of a respective feature. Separately claimed features can be applied separately in a given product or a given process, as the case may be, but can also be applied simultaneously therein in any combination of two or more of such features.

The invention(s) represented by the present disclosure is (are) not limited to the embodiments and/or the examples that are explicitly mentioned herein, but also encompass(-es) amendments, modifications and practical applications thereof, in particular those that lie within reach of the person skilled in the relevant art.

The invention claimed is:

1. A method for operating a continuously variable transmission comprising two pulleys (1, 2), each defining an effectively V-shaped circumference groove of variable width, a drive belt (3) wrapped around the pulleys (1, 2) and a cooling system, which cooling system is provided with valve means (40) for influencing an amount of a cooling agent that is supplied to the drive belt (3), wherein, the valve means (40) are arranged to allow at least a minimum amount of the cooling agent to be supplied to the drive belt (3) during operation of the transmission, and wherein the amount of the cooling agent supplied to the drive belt (3) is amongst others related to the temperature of the drive belt (3), whereas said minimum amount thereof is allowed to be supplied to the drive belt (3) irrespective of such temperature.

2. The method for operating a continuously variable transmission according to claim 1, wherein a target minimum temperature is defined either for the temperature of the drive belt (3) or for the temperature of the cooling agent and wherein, if and when a measured value of the temperature of the drive belt (3), or of the temperature of the cooling agent respectively, is below such target minimum temperature, the said minimum amount of the cooling agent is allowed to be supplied to the drive belt (3) by the said valve means (40).

3. The method for operating a continuously variable transmission according to claim 2, wherein the said target minimum temperature and the said measured temperature are defined, respectively measured in relation the cooling agent having been discharged from a transmission chamber containing the drive belt (3) and the pulleys (1, 2).

4. The method for operating a continuously variable transmission according to claim 3, wherein the said target minimum temperature defined for the cooling agent having been discharged from the transmission chamber has a value in the range between 120 and 140 degrees Centigrade.

5. The method for operating a continuously variable transmission according to claim 1, wherein the said minimum amount of the cooling agent has a value in the range between 1 and 1.5 liters per minute.

6. The method for operating a continuously variable transmission according to claim 1, wherein the cooling system is provided with a heat exchange device (19) for the cooling of the cooling agent and with bypass means (50) for allowing the cooling agent to bypass the heat exchange device (19), wherein a target minimum temperature is defined either for the temperature of the drive belt (3) or for the temperature of the cooling agent and wherein, if and when a measured temperature is below such target minimum temperature, the cooling agent is controlled to bypass the heat exchange device (19), at least in part, by the bypass means (50).

7. Continuously variable transmission comprising two pulleys (1, 2), each defining an effectively V-shaped circumference groove of variable width, a drive belt (3), wrapped around the pulleys (1, 2) and with a cooling system for cooling the drive belt (3) during operation of the transmission by supplying a cooling agent to the drive belt (3) in a re-circulating manner, which cooling system includes a heat exchange device (19) for the cooling of the cooling agent, wherein, the cooling system further includes controllable bypass means (50) arranged in parallel with the heat exchange device (19) to allow a controlled amount of the cooling agent to bypass the heat exchange device (19) during operation of the transmission.

8. The method for operating a continuously variable transmission according to claim 2, wherein the said minimum amount of the cooling agent has a value in the range between 1 and 1.5 liters per minute.

9. The method for operating a continuously variable transmission according to claim 3, wherein the said minimum amount of the cooling agent has a value in the range between 1 and 1.5 liters per minute.

10. The method for operating a continuously variable transmission according to claim 4, wherein the said minimum amount of the cooling agent has a value in the range between 1 and 1.5 liters per minute.

11. The method for operating a continuously variable transmission according to claim 2, wherein the cooling system is provided with a heat exchange device (19) for the cooling of the cooling agent and with bypass means (50) for allowing the cooling agent to bypass the heat exchange device (19), wherein a target minimum temperature is defined either for the temperature of the drive belt (3) or for the temperature of the cooling agent and wherein, if and when a measured temperature is below such target minimum temperature, the cooling agent is controlled to bypass the heat exchange device (19), at least in part, by the bypass means (50).

12. The method for operating a continuously variable transmission according to claim 3, wherein the cooling system is provided with a heat exchange device (19) for the cooling of the cooling agent and with bypass means (50) for allowing the cooling agent to bypass the heat exchange device (19), wherein a target minimum temperature is defined either for the temperature of the drive belt (3) or for the temperature of the cooling agent and wherein, if and when a measured temperature is below such target minimum temperature, the cooling agent is controlled to bypass the heat exchange device (19), at least in part, by the bypass means (50).

13. The method for operating a continuously variable transmission according to claim 4, wherein the cooling system is provided with a heat exchange device (19) for the cooling of the cooling agent and with bypass means (50) for allowing the cooling agent to bypass the heat exchange device (19), wherein a target minimum temperature is defined either for the temperature of the drive belt (3) or for the temperature of the cooling agent and wherein, if and when a measured temperature is below such target minimum temperature, the cooling agent is controlled to bypass the heat exchange device (19), at least in part, by the bypass means (50).

14. The method for operating a continuously variable transmission according to claim 5, wherein the cooling system is provided with a heat exchange device (19) for the cooling of the cooling agent and with bypass means (50) for allowing the cooling agent to bypass the heat exchange device (19), wherein a target minimum temperature is defined either for the temperature of the drive belt (3) or for the temperature of the cooling agent and wherein, if and when a measured temperature is below such target minimum temperature, the cooling agent is controlled to bypass the heat exchange device (19), at least in part, by the bypass means (50).

15. The method for operating a continuously variable transmission according to claim 9, wherein the cooling system is provided with a heat exchange device (19) for the cooling of the cooling agent and with bypass means (50) for allowing the cooling agent to bypass the heat exchange device (19), wherein a target minimum temperature is defined either for the temperature of the drive belt (3) or for the temperature of the cooling agent and wherein, if and when a measured temperature is below such target minimum temperature, the cooling agent is controlled to bypass the heat exchange device (19), at least in part, by the bypass means (50).

16. The method for operating a continuously variable transmission according to claim 10, wherein the cooling system is provided with a heat exchange device (19) for the cooling of the cooling agent and with bypass means (50) for allowing the cooling agent to bypass the heat exchange device (19), wherein a target minimum temperature is defined either for the temperature of the drive belt (3) or for the temperature of the cooling agent and wherein, if and when a measured temperature is below such target minimum temperature, the cooling agent is controlled to bypass the heat exchange device (19), at least in part, by the bypass means (50).

17. A method for operating a continuously variable transmission comprising two pulleys (1, 2), each defining an effectively V-shaped circumference groove of variable width, a drive belt (3) wrapped around the pulleys (1, 2) and a cooling system, which cooling system is provided with valve means (40) for influencing an amount of a cooling agent that is supplied to the drive belt (3), wherein, the valve means (40) are arranged to allow at least a minimum amount of the cooling agent to be supplied to the drive belt (3) during operation of the transmission, and wherein a target minimum temperature is defined either for the temperature of the drive belt (3) or for the temperature of the cooling agent and wherein, if and when a measured value of the temperature of the drive belt (3), or of the temperature of the cooling agent respectively, is below such target minimum temperature, the said minimum amount of the cooling agent is allowed to be supplied to the drive belt (3) by the said valve means (40).

18. The method for operating a continuously variable transmission according to claim 17, wherein the said target minimum temperature and the said measured temperature are defined, respectively measured in relation the cooling agent having been discharged from a transmission chamber containing the drive belt (3) and the pulleys (1, 2).

19. The method for operating a continuously variable transmission according to claim 18, wherein the said target minimum temperature defined for the cooling agent having been discharged from the transmission chamber has a value in the range between 120 and 140 degrees Centigrade.

* * * * *